US011200661B2

(12) United States Patent
Sasaki

(10) Patent No.: US 11,200,661 B2
(45) Date of Patent: Dec. 14, 2021

(54) IMAGE GENERATION APPARATUS, INSPECTION APPARATUS, AND IMAGE GENERATION METHOD

(71) Applicant: Tokyo Electron Limited, Tokyo (JP)

(72) Inventor: Chie Sasaki, Koshi (JP)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 16/782,243

(22) Filed: Feb. 5, 2020

(65) Prior Publication Data

US 2020/0265576 A1 Aug. 20, 2020

(30) Foreign Application Priority Data

Feb. 15, 2019 (JP) .............................. JP2019-025134

(51) Int. Cl.
*G06T 7/00* (2017.01)

(52) U.S. Cl.
CPC .. *G06T 7/0008* (2013.01); *G06T 2207/20081* (2013.01); *G06T 2207/30148* (2013.01)

(58) Field of Classification Search
CPC ......... G06T 7/0008; G06T 2207/20081; G06T 2207/30148; G06T 2207/20084; G06T 5/005; G06T 7/0004; G06T 7/90; G06T 2207/10004; G06K 9/6267
USPC ........................................................ 382/149
See application file for complete search history.

(56) References Cited

U.S. PATENT DOCUMENTS

| 2011/0007961 A1* | 1/2011 | Iwanaga | ............ G01N 21/8851 382/149 |
| 2018/0107982 A1* | 4/2018 | Arya | .................. G06Q 10/1053 |

FOREIGN PATENT DOCUMENTS

| JP | 4165115 B2 * | 10/2008 |
| JP | 2009-238992 A | 10/2009 |

* cited by examiner

*Primary Examiner* — Amandeep Saini
(74) *Attorney, Agent, or Firm* — Posz Law Group, PLC

(57) ABSTRACT

An image generation apparatus configured to generate a substrate image for inspection regarding a defect on a substrate, the substrate having a frame pattern formed on a surface thereof, the frame pattern being a unique pattern for each kind of a treatment recipe for the substrate, the image generation apparatus including: a region estimator configured to estimate a region corresponding to the frame pattern in a substrate image of an inspection object based on an identification model, the identification model being acquired by machine learning in advance and for identifying an image of the frame pattern included in a substrate image; and an eraser configured to erase the image of the frame pattern from the substrate image of the inspection object based on an estimation result by the region estimator to generate the substrate image for inspection.

15 Claims, 7 Drawing Sheets

IMAGE GENERATION APPARATUS, INSPECTION APPARATUS, AND IMAGE GENERATION METHOD

CROSS REFERENCE TO RELATED APPLICATIONS

This application is based upon and claims the benefit of priority of the Japanese Patent Application No. 2019-25134, filed in Japan on Feb. 15, 2019, the entire contents of which are incorporated herein by reference.

TECHNICAL FIELD

This disclosure relates to an image generation apparatus, an inspection apparatus, and an image generation method.

BACKGROUND

Japanese Laid-open Patent Publication No. 2009-238992 discloses a defect inspection method for detecting the presence or absence of a defect from imaging data obtained by imaging a substrate to be inspected. More specifically, the defect inspection method in Japanese Laid-open Patent Publication No. 2009-238992 relates to a defect inspection of a substrate on which a plurality of kinds of films are layered, in which imaging data on a plurality of substrates on each of which only one film different in kind is not formed are categorized on a film kind basis and previously recorded in a database as teaching data. In this state, the defect inspection method in Japanese Laid-open Patent Publication No. 2009-238992 images the substrate to be inspected on which a plurality of kinds of films are layered to thereby acquire imaging data, and detects the presence or absence of a defect from the acquired imaging data. Further, color information in a region of the detected defect is extracted as a value conforming to a predetermined color system, and color information in the same region as the region of the detected defect is extracted as a value conforming to the predetermined color system for each film kind from the teaching data on all of the film kinds recorded in the database. Then, a difference degree between the color information in the region of the detected defect and the color information extracted from the teaching data is calculated for each of the film kinds, and when the difference degree is smaller than a predetermined value, it is determined that a defect is present in the film of the same kind as the not-formed film in the teaching data having the color information.

SUMMARY

An aspect of this disclosure is an image generation apparatus configured to generate a substrate image for inspection regarding a defect on a substrate, the substrate having a frame pattern formed on a surface thereof, the frame pattern being a unique pattern for each kind of a treatment recipe for the substrate, the image generation apparatus including: a region estimator configured to estimate a region corresponding to the frame pattern in a substrate image of an inspection object based on an identification model, the identification model being acquired by machine learning in advance and for identifying an image of the frame pattern included in a substrate image; and an eraser configured to erase the image of the frame pattern from the substrate image of the inspection object based on an estimation result by the region estimator to generate the substrate image for inspection.

DETAILED DESCRIPTION

For example, in a photolithography process in a manufacturing process of a semiconductor device, a predetermined series of treatments are performed to form a desired resist pattern on a semiconductor wafer (hereinafter, referred to as a "wafer"). The predetermined series of treatments include a coating treatment of applying a resist solution to form a resist film, exposure processing of exposing the resist film into a desired pattern, a developing treatment of applying a developing solution to the exposed resist film to develop it and so on.

A defect inspection is performed on the wafer W for which the predetermined series of treatments have been finished. The defect inspection is an inspection of whether or not the desired resist pattern is formed, an inspection of the presence or absence of a flaw of the wafer, adhesion of a foreign matter to the wafer, and so on.

In recent years, a captured image obtained by imaging an inspection object wafer is used for the defect inspection in some cases. The defect inspection using the captured image is basically automatically performed by an apparatus, and is sometimes performed by a user based on his/her visual information.

The captured image used for the above defect inspection is also used for determination of the kind of a defect formed on the wafer. Since there is a correlation between the kind of the defect and the cause of occurrence of the defect, for example, the kind of the defect is determined as mentioned above and estimation of the cause of the defect is performed based on the determination result.

Figure 1:
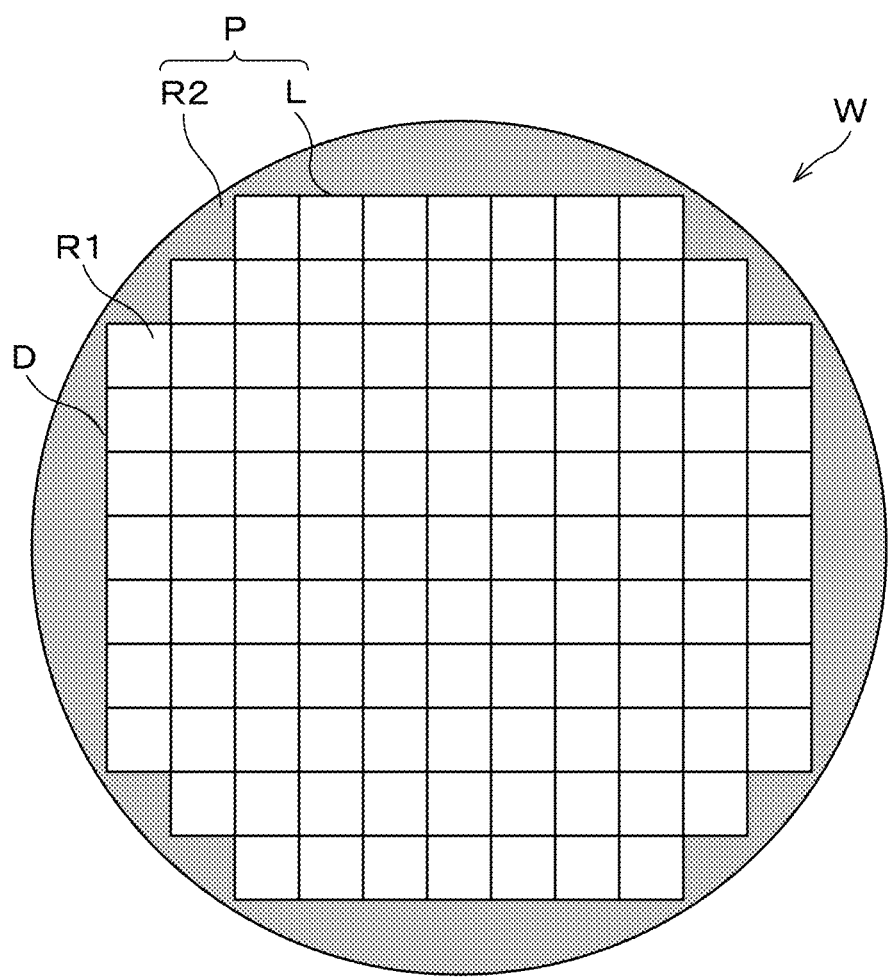
FIG. 1 is a plan view schematically illustrating an example of a semiconductor wafer.

However, the captured image of the wafer sometimes contains an image of a non-device formation region R2 outside a formation region (device formation region) R1 of semiconductor devices D of the wafer W as illustrated in FIG. 1. Further, on the surface of the wafer W, a line having regularity such as a boundary line L between the semiconductor devices (including their intermediate products) D is formed in some cases. An image of the boundary line L and so on are included in the captured image of the wafer W.

Therefore, an inspection for defects cannot be sometimes accurately performed in an inspection using the captured image of the wafer W because a defect formed in the non-device formation region R2 cannot be recognized or the boundary line L is recognized as a defect.

When the images of the non-device formation region R2 and the boundary line L are erased from the captured image of the wafer W, an accurate inspection can be performed. However, there are many kinds of the non-device formation region R2 and the boundary line L which are unique to each kind of the treatment recipe performed on the wafer W. It is difficult to designate a pattern (hereinafter, referred to as a "frame pattern") unique to each kind of treatment recipe, as a portion which should be erased. For example, there is a conceivable method of designating the non-device formation region R2, such as a method of designating the non-device formation region R2 by a distance regarding a radial direction from the center of the wafer W. However, a peripheral edge portion of the device formation region R1 of the wafer W is in a stepped form, and therefore this method cannot suitably designate only the non-device formation region R2 as a portion which should be erased.

In other words, in the case where the image of the wafer W includes the images of the non-device formation region R2 and the boundary line L, the recognition accuracy of a defective portion in the image of the wafer W by an apparatus or a person has room for improvement.

Hence, a technique according to this disclosure improves the recognition accuracy of a defective portion in a substrate image.

Hereinafter, a substrate treatment apparatus and an inspection method according to this embodiment will be explained referring to the drawings. Note that in this specification and the drawings, the same codes are given to components having substantially the same functional configurations to omit duplicated explanation.

Figure 2:
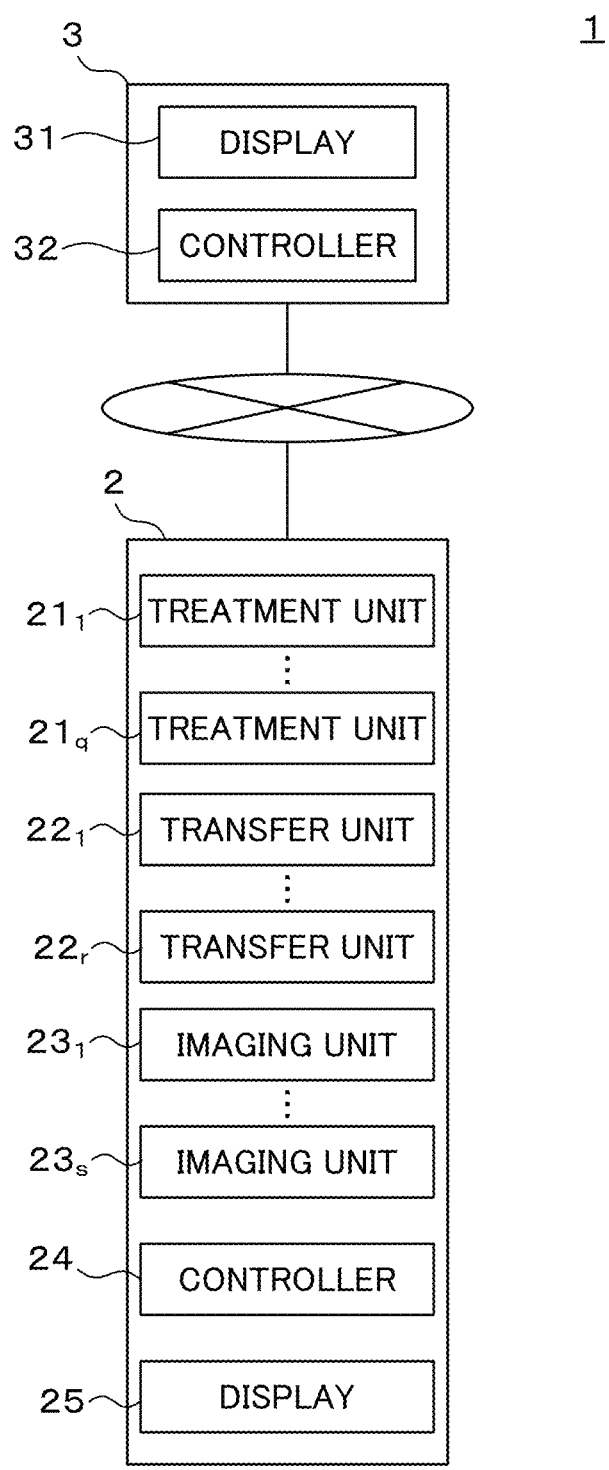
FIG. 2 is a block diagram illustrating the outline of a configuration of an inspection system including an inspection apparatus as an image generation apparatus according to an embodiment.
Figure 3:
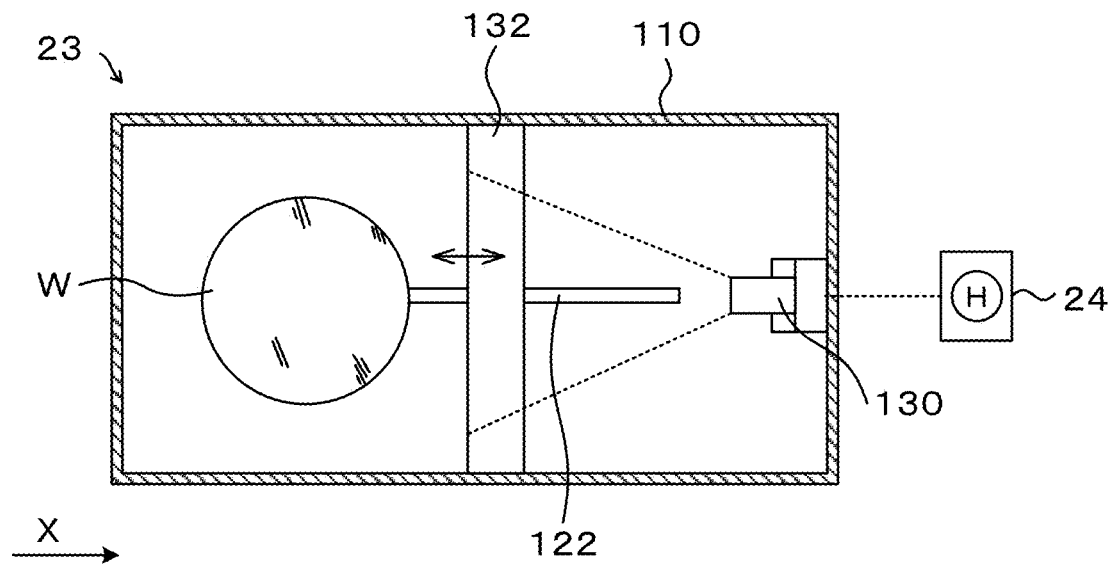
FIG. 3 is a transverse sectional view illustrating a schematic configuration of an imaging unit.
Figure 4:
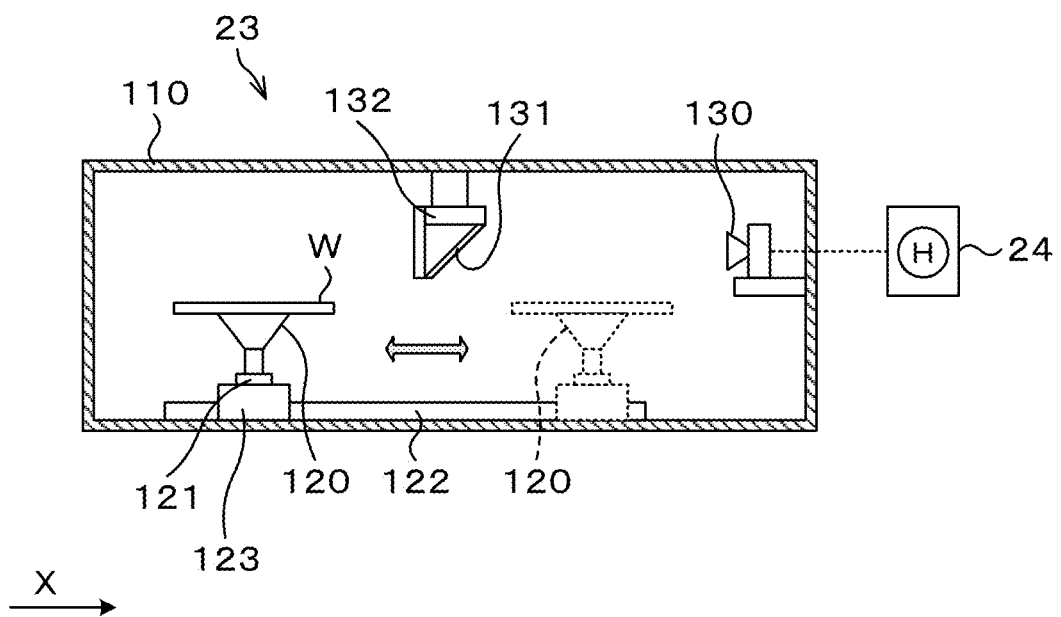
FIG. 4 is a longitudinal sectional view illustrating the schematic configuration of the imaging unit.
Figure 5:
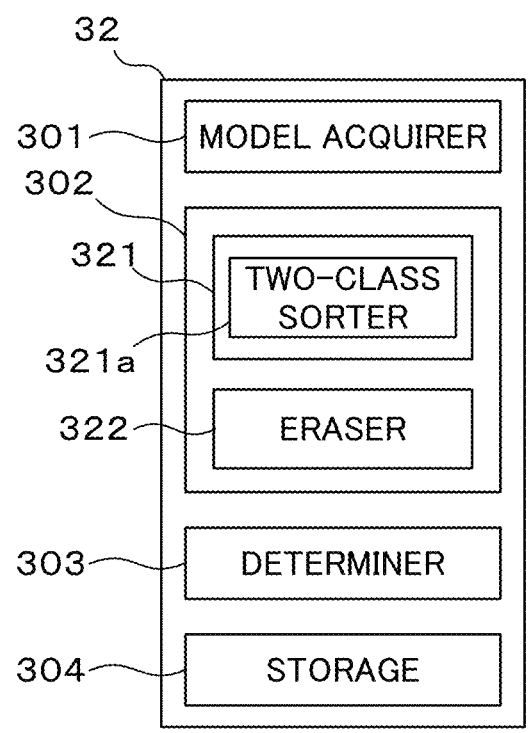
FIG. 5 is a block diagram schematically illustrating a configuration of a controller of an inspection apparatus.

FIG. 2 is a block diagram illustrating the outline of a configuration of an inspection system 1 including an inspection apparatus as an image generation apparatus according to this embodiment. FIG. 3 and FIG. 4 are a transverse sectional view and a longitudinal sectional view illustrating a schematic configuration of an imaging apparatus. FIG. 5 is a block diagram schematically illustrating a configuration of a controller of the inspection apparatus.

The inspection system 1 includes a substrate treatment apparatus 2, and an inspection apparatus 3 as the image generation apparatus as illustrated in FIG. 2. The substrate treatment apparatus 2 and the inspection apparatus 3 are connected with each other over a network such as a local area network (LAN) or the Internet.

The substrate treatment apparatus 2 is a semiconductor manufacturing apparatus such as a coating and developing treatment apparatus. The substrate treatment apparatus 2 includes treatment units $21_1$ to $21_q$ which perform various treatments such as a coating treatment for forming a resist film on the wafer W as a substrate, and transfer units $22_1$ to $22_r$ which perform transfer of the wafer W in the substrate treatment apparatus 2. The substrate treatment apparatus 2 further includes imaging units $23_1$ to $23_s$ for defect inspection. The substrate treatment apparatus 2 further includes a controller 24 which controls the treatment units $21_1$ to $21_q$ (hereinafter collectively referred to as "treatment units 21"), the transfer units $22_1$ to $22_r$ (hereinafter collectively referred to as "transfer units 22"), and the imaging units $23_1$ to $23_s$ (hereinafter collectively referred to as "imaging units 23") and so on. The substrate treatment apparatus 2 further includes a display 25 which displays various kinds of information.

Here, the imaging unit 23 is explained.

The imaging unit 23 has a casing 110 as illustrated in FIG. 3. In the casing 110, a mount 120 for mounting the wafer W thereon is provided as illustrated in FIG. 4. The mount 120 can freely rotate and stop by a rotation drive 121 such as a motor. On a bottom surface of the casing 110, a guide rail 122 extending from one end side (an X-direction negative direction side in FIG. 4) to the other end side (an X-direction-positive direction side in FIG. 4) in the casing 110. The mount 120 and the rotation drive 121 are provided on the guide rail 122 and can move along the guide rail 122 by a drive 123.

On a side surface on the other end side (the X-direction positive direction side in FIG. 4) in the casing 110, an imager 130 is provided. For the imager 130, for example, a wide-angle CCD camera is used. Near the middle of an upper part of the casing 110, a half mirror 131 is provided. The half mirror 131 is provided at a position facing the imager 130 in such a state that its mirror surface is inclined upward at 45 degrees toward the imager 130 from a state of being directed vertically downward. Above the half mirror 131, an illuminator 132 is provided. The half mirror 131 and the illuminator 132 are fixed to the upper surface in the casing 110. The illumination from the illuminator 132 passes through the half mirror 131 and is applied downward. Accordingly, light reflected from an object existing in an illumination region is further reflected from the half mirror 131 and captured into the imager 130. In other words, the imager 130 can image the object existing within the irradiation region by the illuminator 132. The captured image is input into the controller 24.

In the imaging unit 23, during the time when the wafer W is moving from the one end side toward the other end side (from the X-direction negative direction side to the X-direction-positive direction side in FIG. 4) in the casing 110 along the guide rail 122, the imager 130 intermittently captures an image and thereby captures an image of the entire surface of the wafer W. As a result of this, image data on the entire wafer surface is acquired by the controller 24.

Note that hereinafter, the image data on the entire wafer surface is referred to as a substrate image, and the image obtained by imaging in the substrate image is referred to as a captured image. Besides, the substrate image and the captured image relating to the inspection object wafer W are sometimes abbreviated as the substrate image of the inspection object and the captured image of the inspection object.

Explanation is returned to FIG. 2.

The controller 24 is composed of, for example, a computer including a CPU, a memory and so on, and includes a program storage (not illustrated). In the program storage, a program for controlling the various treatments in the substrate treatment apparatus 2 is stored. In the program storage, a program for realizing the defect inspection processing based on the substrate captured image is also stored. Note that the above programs may be the ones that are recorded in a computer-readable storage medium and installed from the storage medium into the controller 24. Part or all of the programs may be realized by dedicated hardware (circuit board).

When it is determined that there is a defect in the defect inspection processing in the substrate treatment apparatus 2, a corresponding captured image is output to the inspection apparatus 3 as the captured image of the inspection object in the inspection apparatus 3.

The display 25 is a display device composed of a liquid crystal panel, an organic EL panel or the like.

The inspection apparatus 3 is intended for determining the kind of the defect formed on the inspection object wafer W based on the captured image of the inspection object, and includes a display 31 and a controller 32.

The display 31 is a display device composed of a liquid crystal panel, an organic EL panel, or the like similarly to the display 25 of the substrate treatment apparatus 2, and displays various kinds of information such as the determination result of the kind of the defect.

The controller 32 is composed of, for example, a computer including a CPU, a memory and so on, and includes a program storage (not illustrated). In the program storage, a program for controlling the various kinds of processing in the inspection apparatus 3 is stored. In the program storage, a program for realizing defect kind determination processing including later-explained model acquisition processing and image generation processing is also stored. Note that the above programs may be the ones that are recorded, for example, in a computer-readable storage medium and installed from the storage medium into the controller 32.

The controller 32 includes a model acquirer 301, an inspection image generator 302, a determiner 303, and a storage 304 as illustrated in FIG. 5.

The model acquirer 301 acquires an identification model (a feature amount of a frame pattern P) which identifies an image of a frame pattern P (see FIG. 1) included in the substrate image by machine learning in advance. The above "in advance" means being prior to the determination of the kind of the defect formed on the inspection object wafer W based on the captured image of the inspection object. The identification model for identifying the image of the frame pattern P included in the substrate image (hereinafter, sometimes abbreviated as a "frame pattern identification model") is more specifically a model for determining whether a picture element is a picture element corresponding to the frame pattern for each picture element of the substrate image.

Further, the machine learning used for acquiring the above identification model in the model acquirer 301 is, for example, deep learning, and more specifically a CNN (Convolutional Neutral Network) is used as a learning algorithm. As a method of the learning, supervised learning is used. The details of the machine learning of the frame pattern identification model by the model acquirer 301 will be explained later.

In the deep learning by the supervised learning in the model acquirer 301, a data set including the substrate image for acquiring a model and information on the presence or absence of the image of the frame pattern P in the substrate image is used. The data set includes both a later-explained frameless image set artificially created and a framed image set.

Figure 6:
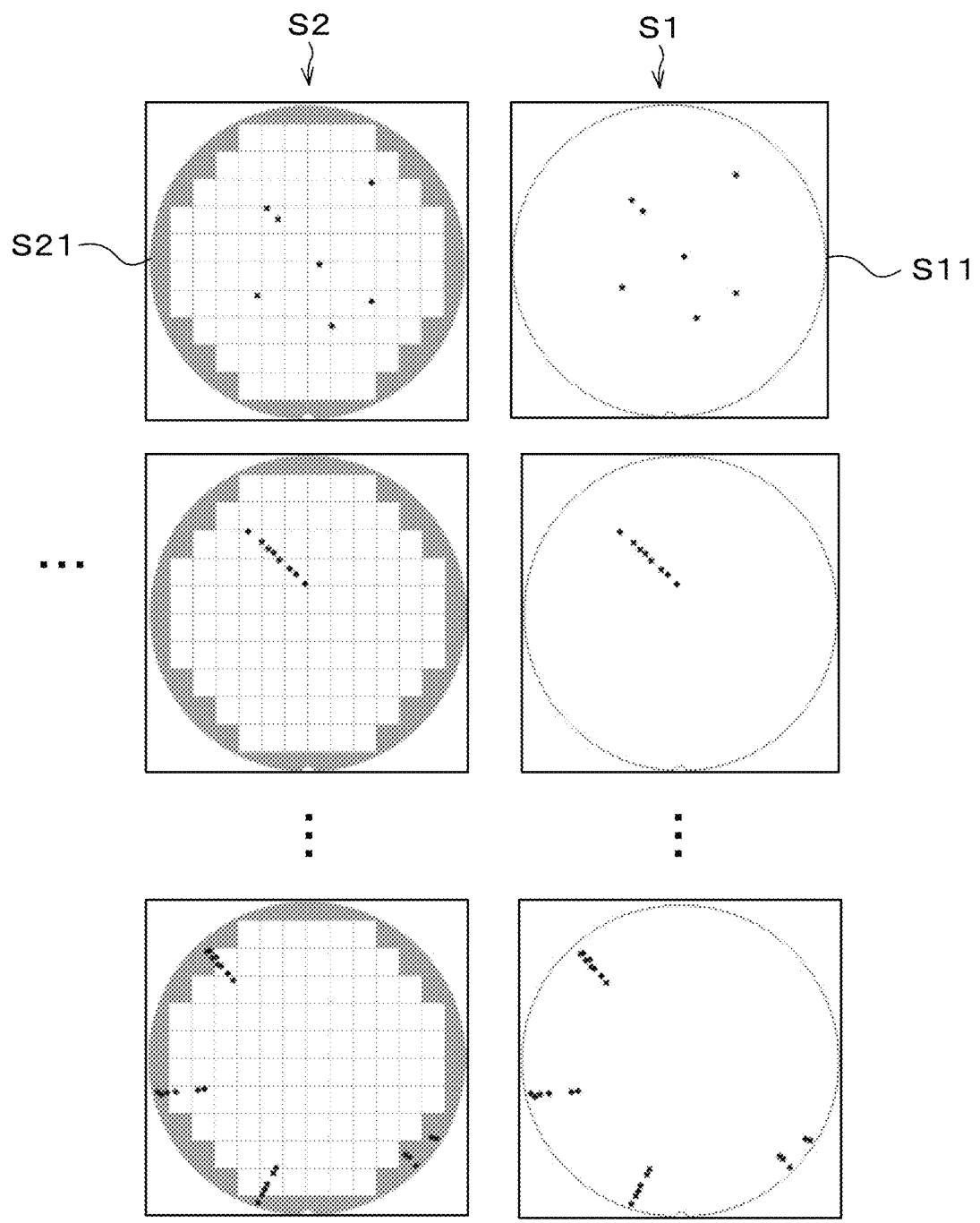
FIG. 6 is an explanatory view of a data set used for machine learning of a frame pattern identification model.

As illustrated in FIG. 6, a frameless image set S1 has a plurality of frameless images S11 which are artificial substrate images relating to the wafers W each of which is not formed with frame pattern P but has defects, and defect distributions are different from one another in the frameless images S11. The defect distribution of each of the frameless images S11 may be intentionally created or may be created from the past actual substrate image.

Besides, the framed image set S2 has framed images S21 corresponding to the substrate images (frameless images) S11 of the frameless image set S1 on a one-to-one basis. Each of the framed images S21 is made by combining the substrate image relating to the wafer W which has a known frame pattern and is formed with no defects with the corresponding frameless image S11. Accordingly, the frameless image S11 and the corresponding framed image S21 have images of the same defects at the same positions. In other words, the frameless image S11 and the corresponding framed image S21 have the same defect image distribution. Note that the substrate image relates to the wafer W which has a known frame pattern and is formed with no defects is acquired using, for example, the imaging unit 23 of the substrate treatment apparatus 2 and is output from the substrate treatment apparatus 2 to the inspection apparatus 3.

Further, there are a plurality of known frame patterns, and the framed image set S2 is created for each of the known frame patterns. More specifically, the model acquirer 301 acquires a frame pattern identification model using a data set including the frameless image set S1 and a plurality of framed image sets S2 each corresponding to the set 1, as the data set for supervised learning.

The inspection image generator 302 generates the substrate image for inspection using the frame pattern identification model acquired in advance by the model acquirer 301. The inspection image generator 302 includes a region estimator 321 and an eraser 322.

The region estimator 321 estimates a region corresponding to the frame pattern P in the captured image of the inspection object based on the frame pattern identification model acquired in advance by the model acquirer 301. Specifically, the region estimator 321 includes a two-class sorter 321a which determines, for each of the picture elements of the captured image of the inspection object, whether the picture element is a picture element (frame pattern picture element) corresponding to the frame pattern or a picture element (background picture element) corresponding to a part which is not the frame pattern, based on the frame pattern identification model. The details of the two-class sorter 321a will be explained later. Then, the region estimator 321 estimates a region (frame region) corresponding to the frame pattern P and a region (background region) other than the former region based on the determination result in the two-class sorter 321a.

The eraser 322 erases the image of the frame pattern P from the captured image of the inspection object based on the estimation result by the region estimator 321 to generate the substrate image for inspection. Specifically, the eraser 322 performs processing so that the frame region of the captured image of the inspection object is painted in a color in the background region of the captured image. More specifically, picture elements B in the device formation region R1 which has not been determined to be the frame region in a predetermined circular region SQ in the captured image of the inspection object are extracted, and an average value of all of the extracted picture elements B is obtained and set as an average picture element value in the background region of the captured image. Then, the eraser 322 changes the picture element value of each picture element in the frame region of the captured image of the inspection object into the average picture element value in the background region of the captured image. Note that the method of deciding the average picture element value in the background region of the captured image is not limited to the above method, but may be other methods such as the one obtaining and using an average value of picture element values of a plurality of picture elements B adjacent to the frame regions.

The determiner 303 determines the kind of the defect formed on the inspection object wafer W based on the substrate image for inspection generated by the eraser 322.

The determiner 303 performs the above determination using, for example, information stored in the storage 304 storing various kinds of information. In the storage 304, the substrate image relating to the wafer W having a representative defect (hereinafter, referred to as a "representative defect substrate image") is stored in association with the kind of the defect. The determiner 303 extracts the representative defect substrate image similar to the substrate image for inspection generated by the eraser 322 from among the representative defect substrate images stored in the storage 304. Then, the determiner 303 determines the kind of the defect associated with the extracted representative defect substrate image as the kind of the defect formed on the inspection object wafer W.

Examples of the method of extracting the similar representative defect substrate image include a method using deep learning, a method using a pattern matching and so on.

Note that in the method using deep learning, the feature amount of the substrate image for inspection and the feature amount of the representative defect substrate image are extracted using deep learning, and the representative defect substrate image having a similar feature amount is extracted as a substrate image similar to the substrate image for inspection. More specifically, when the output of a fully connected layer immediately before the output layer in the convolutional neural network is a feature vector, the representative defect substrate image having a feature vector whose Euclidean distance with respect to the feature vector of the substrate image for inspection is smallest is extracted as the above similar substrate image.

The determination result by the determiner 303 is output, for example, via the display 31. The above determination result may be transmitted to an external part via a not-illustrated communicator, or may be transmitted to the substrate treatment apparatus 2 and displayed on the display 25.

Note that the representative defect substrate image stored in the storage 304 is made by performing, for example, the processing similar to that in generating the substrate image for inspection and erasing the image of the frame pattern P from the original substrate image.

Figure 7:
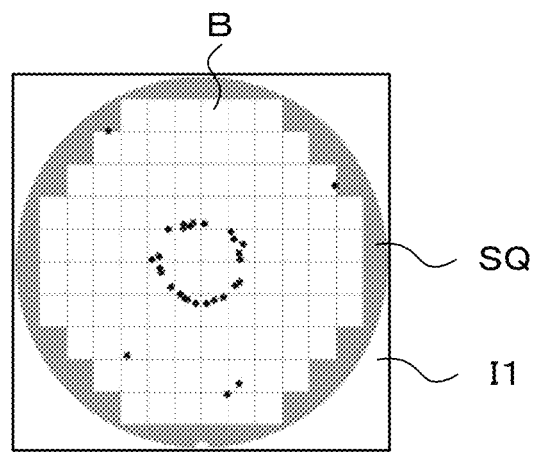
FIG. 7 is a view illustrating an example of a captured image of an inspection object.
Figure 8:
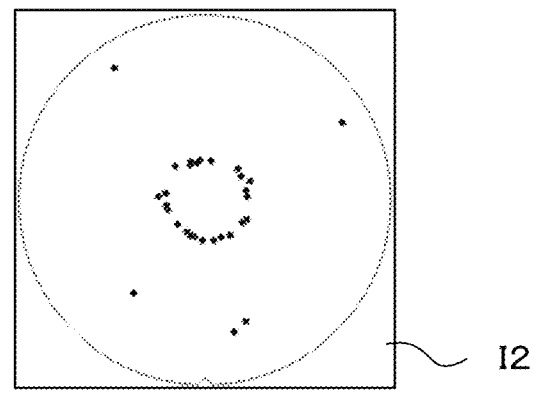
FIG. 8 is a view illustrating an example of the substrate image for inspection generated from the captured image of the inspection object in FIG. 7.

Next, the defect kind determination processing including the model acquisition processing and the image generation processing in the controller 32 is explained. FIG. 7 and FIG. 8 are used for the explanation. FIG. 7 is a view illustrating an example of the captured image of the inspection object. FIG. 8 is a view illustrating an example of the substrate image for inspection generated from the captured image of the inspection object in FIG. 7.

First, to acquire the frame pattern identification model, the data set including the frameless image set S1 and the framed image set S2 is input via a not-illustrated inputter and stored in the storage 304.

Then, the model acquirer 301 performs learning of the frame pattern identification model by deep learning using the above data set stored in the storage 304. The learning result of the frame pattern identification model, namely, the frame pattern identification model acquired by learning is stored in the storage 304. In the above manner, the frame pattern identification model is acquired in advance.

When it is determined that there are defects by the defect inspection processing in the substrate treatment apparatus 2, a captured image I1 in FIG. 7 relating to the wafer W determined that there are defects is input from the substrate treatment apparatus 2 to the inspection apparatus 3 via the not-illustrated inputter as the captured image I1 of the inspection object.

The captured image I1 of the inspection object input into the inspection apparatus 3 is subjected to estimation of the frame region and the background region in the captured image by the region estimator 321 based on the frame pattern identification model acquired in advance by the model acquirer 301. The estimation result by the region estimator 321 is output to the eraser 322.

The eraser 322 erases the frame region of the captured image based on the color in the background region of the captured image of the inspection object to create a substrate image I2 for inspection in FIG. 8 not including the image of the frame pattern P. The created substrate image for inspection is input into the determiner 303.

The determiner 303 determines the kind of the defect of the inspection object wafer W based on the substrate image for inspection created by the eraser 322. Note that in the case where a plurality of defects are formed on the inspection object wafer W, the determination of the kind of the defect may be performed for each of the defects.

Then, the determination result of the kind of the defect by the determiner 303 is displayed on the display 31.

The substrate image for inspection itself created by the eraser 322 may be displayed on the display 31. Thus, a user who views the displayed substrate image for inspection can determine the kind of the defect of inspection object wafer W based on the visual information.

Note that the defect detected by the substrate treatment apparatus 2 and the defect being a determination object in the inspection apparatus 3 are at least one of a portion not having a predetermined shape in the coating film, a flaw on the wafer W, and a foreign matter on the wafer W.

As explained above, in this embodiment, the region corresponding to the frame pattern P in the captured image of the inspection object is estimated using the frame pattern identification model obtained by the machine learning in advance, and the image of the frame pattern P is erased from the captured image of the inspection object based on the estimation result to generate the substrate image for inspection. Accordingly, the substrate image for inspection does not include the image of the frame pattern P, thus making it possible to improve the recognition accuracy of the portion corresponding to the defect in the substrate image for inspection. Further, the frame pattern identification model acquired by the machine learning is used, so that even if the frame pattern P formed on the wafer W is unknown, the region corresponding to the frame pattern P in the captured image of the inspection object can be estimated and removed from the captured image of the inspection object.

Note that the captured image of the inspection object sometimes includes a unique pattern in each imaging environment of the imaging unit 23. According to this embodiment, the unique pattern in each imaging environment of the imaging unit 23 can also be removed.

Further, in this embodiment, the frame pattern identification model is acquired by the machine learning using the data set including the frameless image set S1, the framed image set S2, and the information representing the presence or absence of the image of the frame pattern for each substrate image included in the sets S1, S2. Accordingly, an accurate frame pattern identification model can be acquired.

Furthermore, in this embodiment, the eraser 322 changes the picture element value of each picture element in the frame region of the captured image of the inspection object into the average picture element value in the background region of the captured image. In other words, the eraser 322 erases the image of the frame pattern in the captured image based on the picture element in the background region of the captured image of the inspection object. Accordingly, the recognition accuracy of the portion corresponding to the defect in the substrate image for inspection can be improved irrespective of the color in the background region.

The image of the frame pattern P to be erased from the captured image of the inspection object is the image of the non-device formation region R2 and the image of the boundary line L between the semiconductor devices D in the above example. However, the frame pattern P may be a pattern formed on the surface of the semiconductor device (including its intermediate product) D. More specifically, the image of the frame pattern P to be erased in the inspection apparatus 3 as the image generation apparatus according to this embodiment is at least one of the image of the non-device formation region R2, the image of the boundary line L between the semiconductor devices D, and the patterns formed on the surfaces of the semiconductor devices D.

Note that the generated substrate image for inspection is used for the determination of the kind of the defect in this embodiment, but the generated substrate image for inspection may be used for defect detection.

Besides, the defect in this embodiment is at least one of a portion not having a predetermined shape in the coating film such as a resist film, the flaw on the wafer W, and the foreign matter on the wafer W.

The defect kind determination processing including the model acquisition processing and the image generation processing is performed in the inspection apparatus 3 in the above explanation, but may be performed in the substrate treatment apparatus 2. In other words, the function of the inspection apparatus 3 may be installed in the substrate treatment apparatus 2.

Further, in the above explanation, the substrate image of the inspection object is the captured image obtained by imaging. However, the substrate image of the inspection object is not limited to this, but may be, for example, a substrate image created as follows. Specifically, a substrate image (base substrate image) relating to a wafer W which has the same frame pattern P as that of the inspection object wafer W and is formed with no defects is prepared. Then, the defect inspection is performed on the entire inspection object wafer W, and when a defect is detected, the defect is drawn at a position corresponding to a portion where the defect in the base substrate image is detected. The thus-obtained substrate image may be used as the substrate image of the inspection object.

Figure 9:
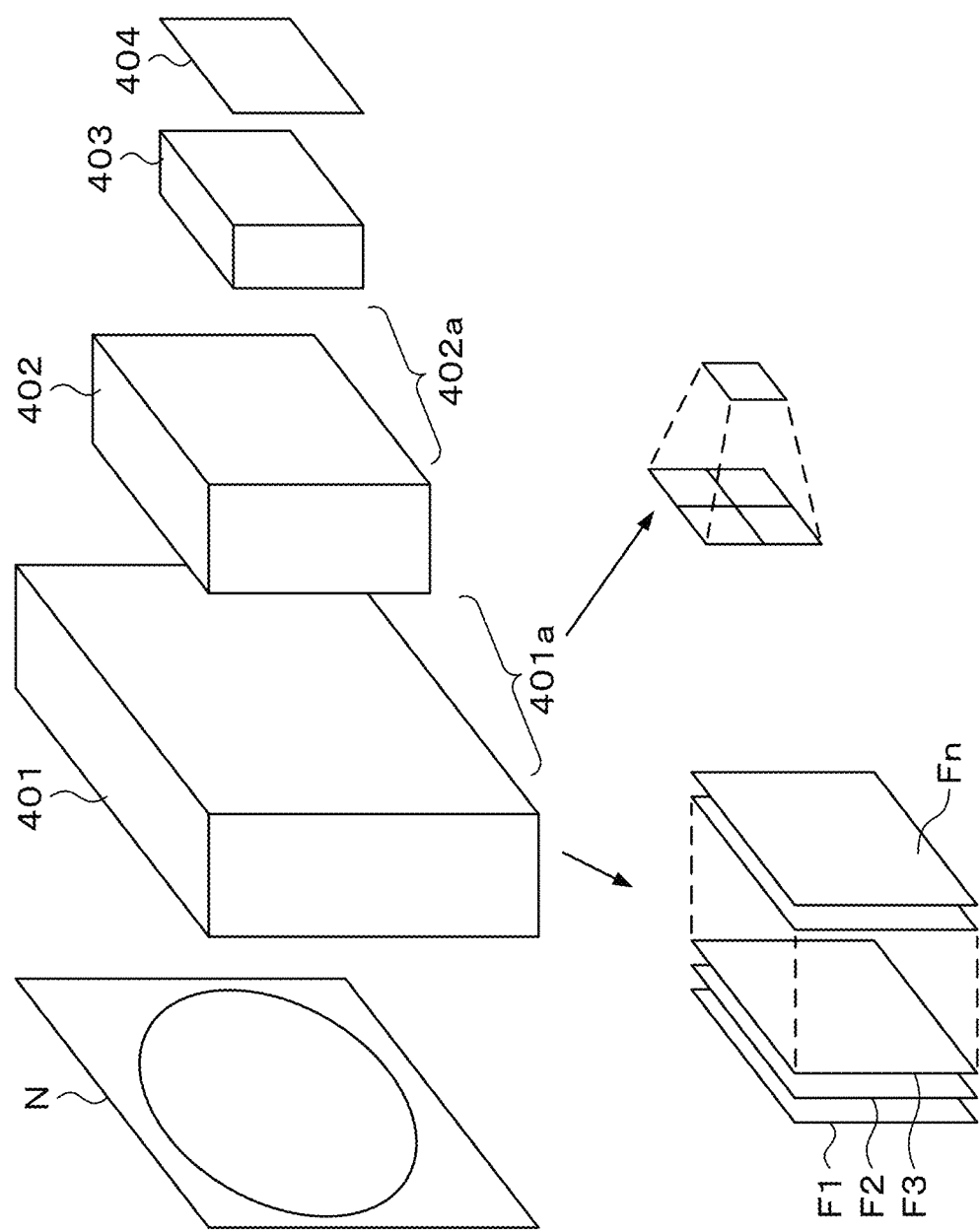
FIG. 9 is an explanatory view of a processing example in a model acquirer.

Next, the deep learning (specifically, CNN) for acquiring the frame pattern identification model performed by the model acquirer 301 and the processing in the two-class sorter 321a of the region estimator 321 are explained. FIG. 9 is a view extremely schematically illustrating a layer structure of CNN.

The deep learning used for acquiring the frame pattern identification model by the model acquirer 301 includes convolution layers 401 to 403, pooling layers 401a, 402a, and a connected layer 404 as illustrated in the drawing. In the convolution layers 401 to 403, a plurality of filters are layered, and an array of filters F1, F2, . . . is illustrated as a picture for the convolution layer 401 as a representative in the drawing.

For easy understanding here, it is assumed that the substrate image (the frameless image S11 or the framed image S21) to be input into the model acquirer 301 is a gray-scale image composed of n×n picture elements in a matrix form. A substrate image N input into the model acquirer 301 is input into the filter F1 composed of n×n picture elements in the front row in the convolution layer 401 at the front stage.

The picture element value of the substrate image N may be a value subjected to normalizing processing or a value subjected to standardization processing, and is a numerical value of "0" to "1". When the picture element value of a picture element (i, j) of the input substrate image N is x(i, j), the picture element value of the picture element (i, j) being a pixel of the filter F1 is the same value as x(i, j), and described as f1($i$, D{=x(i, j)}. Note that (i, j) represents a picture element in an i row and in a j column in the n×n picture elements. The picture element of the filter can be said also as a node.

The picture element value {f2($i$, $j$)} of the picture element (i, j) in the filter F2 is obtained by integrating the picture element value of each of n×n picture elements (1, 1) to (n, n) in the filter F1 by a predetermined coefficient, adding all of the obtained integrated values to obtain an additional value I, and performing a predetermined operation on the additional value I.

The above predetermined coefficient is a value decided by the learning for each combination between the picture element of the filter F1 and the picture element of the filter F2. More specifically, the value is decided by repeating the supervised (correct-labeled) learning.

An example of the above predetermined operation is an operation using a sigmoid function using, for example, the additional value I as an input. The convolution processing is performed in the above manner to obtain the picture element value of each of the n×n picture elements (1, 1) to (n, n) in the filter F2.

f3($i$, $j$) being the picture element value in the filter F3 is similarly to calculated using the picture element value of each of the picture elements in the filter F2, the picture element value in each filter is similarly calculated in sequence, and each picture element value in a filter Fm at the final stage is obtained.

The convolution layer 402 at the next stage to the convolution layer 401 is smaller in the number of picture elements than the convolution layer 401 due to the interposition of the pooling layer 401a. The pooling layer 401a is a portion which performs thinning processing of pixels, and brings, for example, a group of 2×2 picture elements adjacent to each other and constituting a square in the picture element group in the filter Fm at the final stage of the convolution layer 401 into one picture element. In this case, the maximum value of the group of 2×2 picture elements is allocated as a picture element value of one picture element, in other words, the picture elements other than the picture element having the maximum value are excluded. When the above thinning processing is performed, for example, on a group of 27×27 picture elements, a group of 13×13 picture elements is obtained.

The operation is similarly performed between the filters in the convolution layers 402 and 403.

The picture element of the substrate image N input into the model acquirer 301 is handled as the gray-scale image in the above, but in the case where picture element values of an R component, a G component, and a B component are allocated to the picture elements of the substrate image N, a set of the convolution layers 401 to 403, the pooling layers 401a, 402a, and the connected layer 404 is provided for each of components of RGB. In the case where, for example, the above one set is provided for each of the R component, the G component, and the B component and therefore three sets in total exist, the above operation processing for each of the three sets is performed in parallel. Note that the picture element values of the R component, the G component, and the B component are, for example, values of 0 to 1 obtained by normalizing or standardization.

The model acquirer 301 performs the above operation processing to acquire the feature quantity vector, namely, the frame pattern identification model for each of the picture elements of the substrate image N. The feature quantity vector for each of the picture elements of the substrate image N is picture element values of the picture elements corresponding to the picture element of the substrate image N in all of the filters constituting the convolution layers 401 to 403. In other words, the model acquirer 301 performs the above operation processing to acquire the picture element values of the corresponding picture elements on all of the filters constituting the convolution layers 401 to 403 for each of the picture elements of the input substrate image N.

Then, the model acquirer 301 performs the above operation processing on all of the frameless images S11 of the frameless image set S1 and all of the framed images S21 of the framed image set S2 to learn the pattern identification model for each of the picture elements.

The two-class sorter 321a of the region estimator 321 determines whether each of the picture elements of the captured image I1 of the inspection object input into the inspection apparatus 3 is a frame pattern picture element or a background picture element based on the pattern identification model acquired by the model acquirer 301. Specifically, the two-class sorter 321a determines whether or not each of the picture elements of the captured image I1 of the inspection object is the frame pattern picture element based on the feature quantity vector of each of the picture elements of the substrate image acquired by the model acquirer 301. More specifically, the two-class sorter 321a determines whether each of the picture elements of the captured image I1 of the inspection object is a defective picture element or the background picture element based on the array distribution of the picture element values of all of the filters and the feature quantity vector of the picture element corresponding to the picture element.

The two-class sorter 321a is realized by software executing, for example, SVM (Support Vector Machine).

The embodiments disclosed herein are only examples in all respects and should not be considered to be restrictive. The above embodiments may be abbreviated, replaced, or changed in various forms without departing from the scope and spirit of the attached claims.

Note that the following configurations also belong to the technical scope of this disclosure.

(1) An image generation apparatus configured to generate a substrate image for inspection regarding a defect on a substrate, the substrate having a frame pattern formed on a surface thereof, the frame pattern being a unique pattern for each kind of a treatment recipe for the substrate, the image generation apparatus including:

a region estimator configured to estimate a region corresponding to the frame pattern in a substrate image of an inspection object based on an identification model, the identification model being acquired by machine learning in advance and for identifying an image of the frame pattern included in a substrate image; and an eraser configured to erase the image of the frame pattern from the substrate image of the inspection object based on an estimation result by the region estimator to generate the substrate image for inspection.

According to the (1), it is possible to estimate the region corresponding to the frame pattern in the captured image of the inspection object using the identification model obtained by the machine learning in advance, and erase the image of the frame pattern from the captured image of the inspection object based on the estimation result to generate the substrate image for inspection. Accordingly, the substrate image for inspection does not include the image of the frame pattern irrespective of the kind of the frame pattern, so that the recognition accuracy of the portion corresponding to the defect in the substrate image for inspection can be improved.

(2) The image generation apparatus according to the (1), further including a model acquirer configured to acquire the identification model by the machine learning in advance using a data set including a substrate image and information on presence or absence of the image of the frame pattern in the substrate image.

(3) The image generation apparatus according to the (2), wherein the substrate image included in the data set includes both a frameless substrate image being a substrate image relating to a substrate which is not formed with the frame pattern but has defects, and a framed image being a substrate image made by combining a substrate image relating to a substrate which has a known frame pattern and is formed with no defects with the frameless substrate image.

According to the (3), an accurate identification model can be acquired.

(4) The image generation apparatus according to any one of the (1) to (3), wherein the frame pattern is at least one of a region where semiconductor devices are not formed, a boundary line between the semiconductor devices, and patterns on surfaces of the semiconductor devices.

(5) The image generation apparatus according to one of the (1) to (4), wherein the defect is at least one of a portion not having a predetermined shape in a coating film, a flaw on the substrate, and a foreign matter on the substrate.

(6) The image generation apparatus according to the (1) to (5), wherein the machine learning in advance is deep learning.

(7) The image generation apparatus according to the (1) to (6), configured as an inspection apparatus including a determiner configured to determine a kind of a defect formed on an inspection object substrate based on the substrate image for inspection, wherein the determiner is configured to determine the kind of the defect using machine learning.

(8) An image generation method for generating a substrate image for inspection regarding a defect on a substrate, the substrate having a frame pattern formed on a surface thereof, the frame pattern being a unique pattern for each kind of a treatment recipe for the substrate, the image generation method including:

estimating a region corresponding to the frame pattern in a substrate image of an inspection object based on an identification model, the identification model being acquired by machine learning in advance and for identifying an image of the frame pattern included in a substrate image; and erasing the image of the frame pattern from the substrate image of the inspection object substrate based on an estimation result at the estimating to generate the substrate image for inspection.

According to this disclosure, it is possible to improve the recognition accuracy of a defective portion in a substrate image.

What is claimed is:

1. An image generation apparatus that generates a substrate image for inspection regarding a defect on a substrate, the substrate having a frame pattern formed on a surface thereof, the frame pattern being a unique pattern for each kind of a treatment recipe for the substrate, the image generation apparatus comprising:
a controller having a processor and a memory, the memory storing instructions that, when executed by the processor, cause the processor to
estimate a region corresponding to the frame pattern in a substrate image of an inspection object based on an identification model, the identification model being acquired by machine learning in advance and for identifying an image of the frame pattern included in a substrate image;
erase the image of the frame pattern from the substrate image of the inspection object based on an estimation result by the region estimator to generate the substrate image for inspection; and
acquire the identification model by the machine learning in advance using a data set including a substrate image and information on presence or absence of the image of the frame pattern in the substrate image.

2. The image generation apparatus according to claim 1, wherein
the substrate image included in the data set includes both a frameless substrate image being a substrate image relating to a substrate which is not formed with the frame pattern but has defects, and a framed substrate image being a substrate image made by combining a substrate image relating to a substrate which has a known frame pattern and is formed with no defects with the frameless substrate image.

3. The image generation apparatus according to claim 2, wherein
the frame pattern is at least one of a region where semiconductor devices are not formed, a boundary line between the semiconductor devices, and patterns on surfaces of the semiconductor devices.

4. The image generation apparatus according to claim 2, wherein
the defect is at least one of a portion not having a predetermined shape in a coating film, a flaw on the substrate, and a foreign matter on the substrate.

5. The image generation apparatus according to claim 2, wherein
the machine learning in advance is deep learning.

6. The image generation apparatus according to claim 2, configured as an inspection apparatus, the processor being further configured to determine a kind of a defect formed on an inspection object substrate based on the substrate image for inspection, wherein
the kind of the defect is determined using machine learning.

7. The image generation apparatus according to claim 1, wherein
the frame pattern is at least one of a region where semiconductor devices are not formed, a boundary line between the semiconductor devices, and patterns on surfaces of the semiconductor devices.

8. The image generation apparatus according to claim 1, wherein
the defect is at least one of a portion not having a predetermined shape in a coating film, a flaw on the substrate, and a foreign matter on the substrate.

9. The image generation apparatus according to claim 1, wherein
the machine learning in advance is deep learning.

10. The image generation apparatus according to claim 1, configured as an inspection apparatus, the processor is further configured to determine a kind of a defect formed on an inspection object substrate based on the substrate image for inspection, using machine learning, wherein
the kind of the defect is determined using machine learning.

11. An image generation method for generating a substrate image for inspection regarding a defect on a substrate,
the substrate having a frame pattern formed on a surface thereof, the frame pattern being a unique pattern for each kind of a treatment recipe for the substrate,
the image generation method comprising:
estimating a region corresponding to the frame pattern in a substrate image of an inspection object based on an identification model, the identification model being acquired by machine learning in advance and for identifying an image of the frame pattern included in a substrate image;
erasing the image of the frame pattern from the substrate image of the inspection object based on an estimation result at the estimating to generate the substrate image for inspection; and
acquiring the identification model by the machine learning in advance using a data set including a substrate image and information on presence or absence of the image of the frame pattern in the substrate image.

12. The image generation method according to claim 11, wherein
the frame pattern is at least one of a region where semiconductor devices are not formed, a boundary line between the semiconductor devices, and patterns on surfaces of the semiconductor devices.

13. The image generation method according to claim 11, wherein
the defect is at least one of a portion not having a predetermined shape in a coating film, a flaw on the substrate, and a foreign matter on the substrate.

14. The image generation method according to claim 11, wherein
the machine learning in advance is deep learning.

15. The image generation method according to claim 11, further comprising
determining a kind of a defect formed on an inspection object substrate based on the substrate image for inspection, wherein
the kind of the defect is determined using machine learning.

* * * * *